Patented May 2, 1933

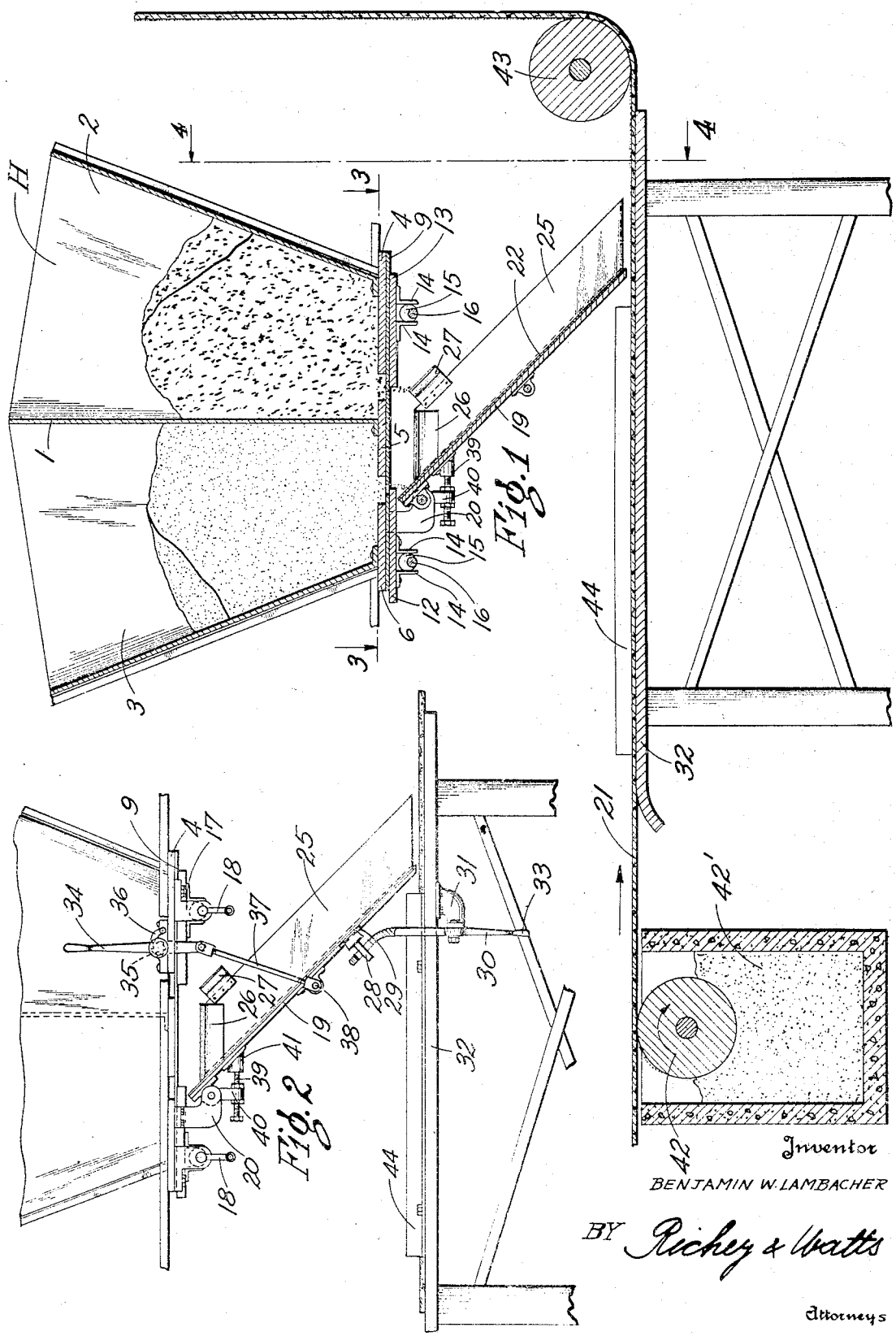

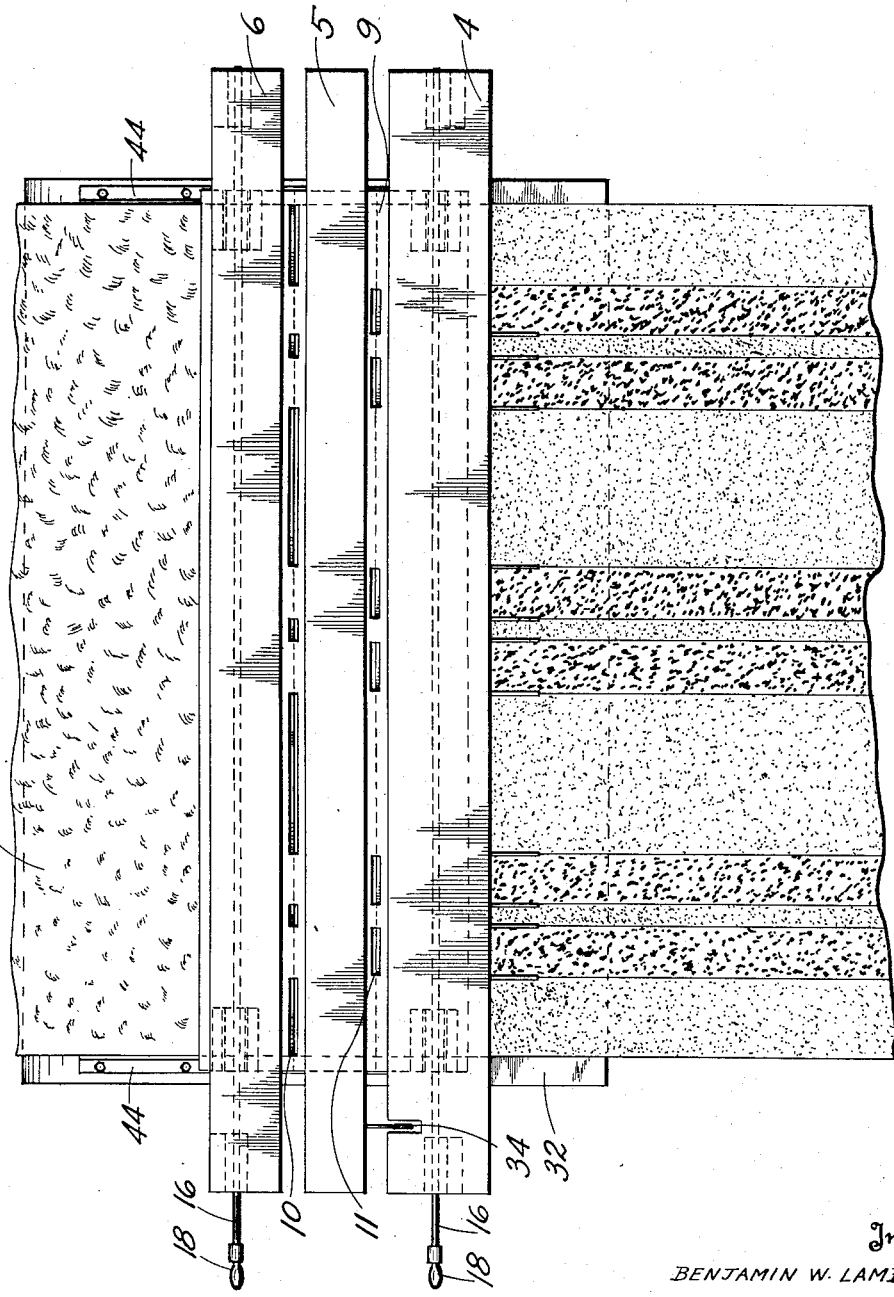

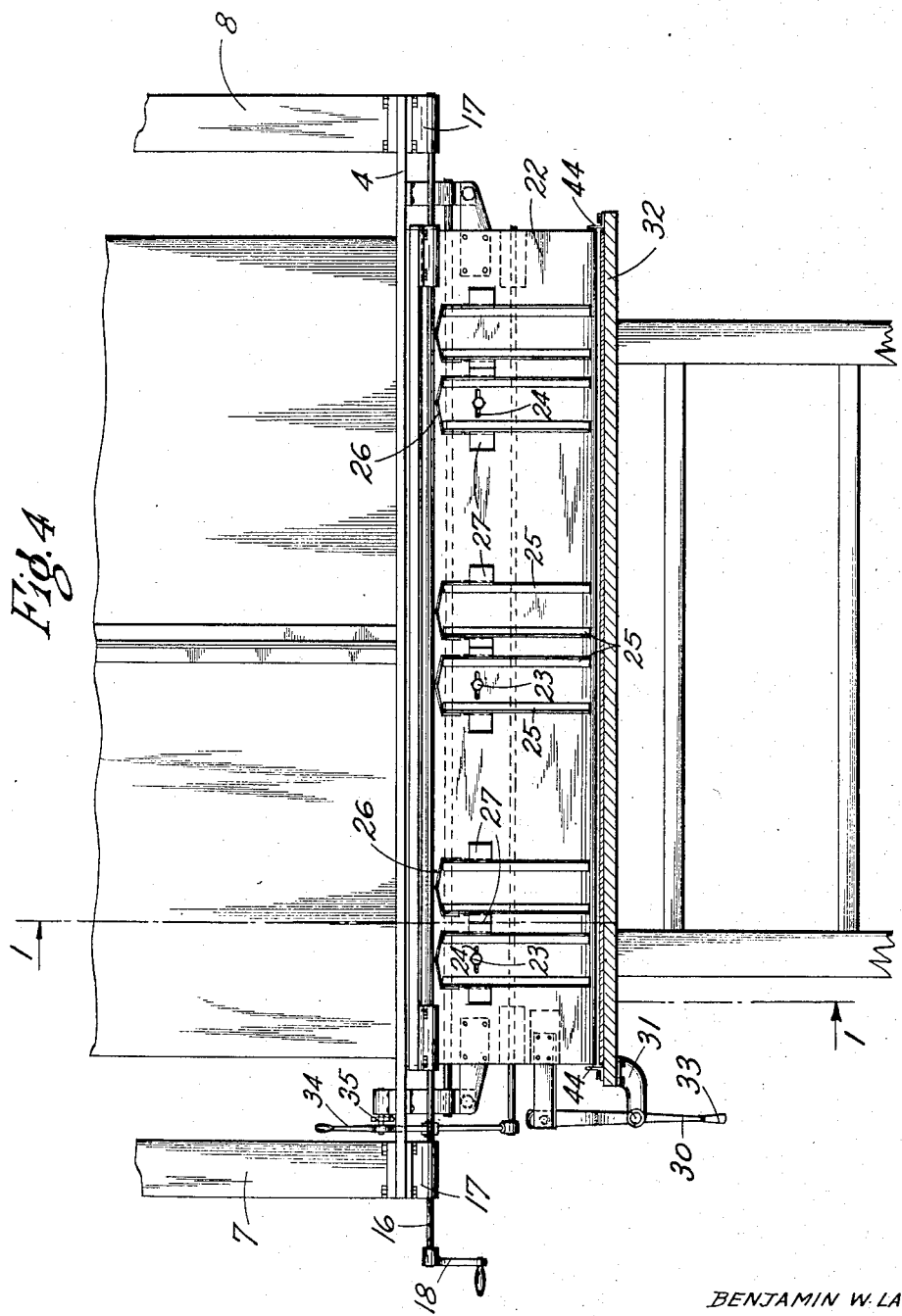

1,906,471

UNITED STATES PATENT OFFICE

BENJAMIN W. LAMBACHER, OF INDEPENDENCE, OHIO, ASSIGNOR TO THE WEAVER-WALL COMPANY, OF CLEVELAND, OHIO, A CORPORATION OF OHIO

APPARATUS FOR APPLYING FLUENT MATERIAL

Application filed November 24, 1930. Serial No. 497,687.

This invention relates to apparatus for applying fluent material to a moving strip of material. More specifically, it relates to apparatus for applying granulated slate or the like to a moving strip of asphalt impregnated felt in the process of making weather proof shingles and siding strips for building construction.

In making material of this class it is usual to impregnate a strip of felt with hot fluid asphalt and then sprinkle granulated slate on one side of the impregnated strip before the asphalt hardens. The granular material is preferably rolled down into the asphalt so that a firm bond is secured to the felt base. The other side of the impregnated strip may be coated with mica, fine sand or powdered talc.

The co-pending application of Ayana L. Wall, Ser. No. 484,352, filed September 25th, 1930, fully describes and claims a siding strip made from asphalt impregnated felt coated with granular material. In the manufacture of this strip the granular material is applied in bands of material of different fineness. It is necessary therefore, to provide means for applying the relatively fine and the coarse granular material to the felt base in accurate and definitely defined bands and it is one of the objects of my invention to provide apparatus which is particularly adapted to be used in a process of manufacturing strips of the type described and claimed in the above noted co-pending application.

Further objects of my invention are the provision, in a granular material applying device, of means for accurately controlling the amount of material applied; the provision of means for applying a plurality of different materials to a moving strip in bands; the provision of apparatus of the type described which positively prevents the mingling of the different materials which are applied to the moving strip and which is adapted to apply the granular material to the strip in bands of any desired width and arrangement; the provision of apparatus for applying granular material which may be quickly and easily adjusted to take care of variations in the operating conditions of the machine.

The above and other objects of my invention will appear from the following description of one form thereof, reference being had to the accompanying drawings in which:

Fig. 1 is a sectional side elevation of my apparatus in position to apply granular material to a moving strip of asphalt impregnated felt.

Fig. 2 is a side elevation of a portion of the apparatus shown in Fig. 1 illustrating the adjusting mechanism thereof.

Fig. 3 is a plan section taken on line 3—3 of Fig. 1.

Fig. 4 is an end view taken on line 4—4 of Fig. 1.

Referring now to Fig. 1 of the drawings, my apparatus consists essentially of a hopper H which is divided by a central wall 1 into two parts 2 and 3. The part 2 of the hopper H, hereinafter referred to as hopper 2, is shown containing relatively coarse granular material and the part 3 of hopper H, hereinafter referred to as hopper 3, contains relatively fine granular material. The bottom of the hoppers 2 and 3 is formed by the spaced supporting bars 4, 5 and 6. These bars support the entire structure and extend out beyond the ends of the hoppers 2 and 3 where they may be supported by any suitable means such as the upwardly extending bars 7 and 8 (Fig. 4). A plate 9 is secured to the under side of the bars 4, 5, and 6 and is provided with a row of slots 10 lying between the bars 5 and 6 and a second row of slots 11 lying between the bars 4 and 5.

The sliding valve plates 12 and 13 are supported to have sliding engagement with the bottom of the plate 9. These plates 12 and 13 extend across the bottoms of the hoppers 2 and 3 and their inner edges are disposed beneath the rows of slots 10 and 11 respectively in the plate 9. Angle members 14 are secured to the ends of the plates 12 and 13 and are adapted to co-act with the eccentrics 15 and the eccentric shafts 16 to provide means for sliding the plates 12 and 13 and thus varying the degree of opening of the slots 10 and 11. The eccentric shafts 16 are provided with handles 18 at their ends and are supported by bearing brackets 17 which are secured to the bars 4 and 6. When the handles 18 are turned, the corresponding plate (12 or 13) will be moved to open or close the slots (10 or 11) in the plate 9, thus causing the flow of granular material through these slots to be increased or diminished and providing accurate regulation of the quantity of granular material applied to the felt strip.

The guide plate 19 is disposed below the slots in the plate 9 and is pivotally connected at its upper end to the brackets 20. This plate 19 is inclined downwardly in the direction of movement of the impregnated sheet 21 and extends to a point closely adjacent to the top surface of said sheet. The purpose of the plate 19 is to convey the granular material which drops through the slots 10 and 11 to the surface of the asphalt impregnated sheet 21. A thin sheet of metal 22, of substantially the same size as the plate 19, is held in place on the top thereof by screws 23 (Fig. 4) which extend through slots 24 in the sheet 22. These screws 23 support the sheet 22 while the slots 24 permit it to have a limited movement transversely of the felt strip 21.

A plurality of upwardly extending flanges 25 are secured to the sheet 22 and are so disposed that they form troughs which are adapted to receive the material discharged through the slots 11 from the hopper 2. The material discharged through the slots 10 from the hopper 3 is prevented from falling into the troughs formed by the flanges 25 by the cover members 26 which close the upper ends of the troughs. Guide pieces 27 are secured to the flanges 25 directly below the slots 11 and serve to prevent the granular material discharged through the slots 11 from falling on to the sheet 22 outside of the troughs.

It will be seen that when the sheet 22 is moved transversely of the strip 21 for purposes of adjustment, these guides 27 will effectually prevent the coarse granular material from the hopper 2 from falling on to the sheet 22 and will direct the material into the troughs formed by the flanges 25.

The apparatus for moving the sheet 22 transversely is best seen in Fig. 2 and consists essentially of a pin 28 which is secured to the sheet 22 and extends downwardly through a cut out portion 29 in the edge of the plate 19. This pin 28 is engaged by a slotted lever 30 which is pivotally mounted on a bracket 31 which is secured to the table 32 over which the impregnated felt 21 travels. When the handle 33 of the lever 30 is moved the sheet 22 will be slid transversely on the sheet 19 for purposes which will be later explained.

In the operation of the apparatus it is at times desirable to lift the guide plate 19 so that its lower end is considerably above the surface of the table 32 and to accomplish this I have provided a lever 34 which is pivotally mounted on a fixed support such as the bar 4. A ratchet wheel 35 is secured to the lever 34 at its pivot point and is adapted to co-act with the pawl 36 to hold the plate 19 in the desired position. The lower end of the lever 34 is connected to the link 37 which in turn, is pivoted at 38 to a bracket on the under side of the plate 19.

The adjusting screw 39 has threaded engagement with a fixed downwardly extending arm 40 and co-acts with the abutment 41 on the plate 19 to provide an adjustable stop for accurately regulating the clearance between the lower end of the plate 19 and sheet 22 and the top surface of the felt strip 21.

Referring again to Fig. 1 and assuming that the machine is in operation, the strip 21, impregnated with hot fluid asphalt, moves over the roller 42 which is supported in a bin 42' of mica, talc or the like and applies a coating of this material to the under side of the strip. This coating permits the strip to move freely over the surface of the table 32 and also prevents sticking together of the finished shingle or sliding strips. As the strip passes under the lower end of the plate 19, the fine granular material from the hopper 3 is applied to the top surface thereof in bands which correspond in location to the positions of the slots 10 in the bottom of the hopper 3. The coarse granular material from the hopper 2 falls into the troughs formed by the flanges 25 and is applied in bands of the same width as the troughs and disposed between the bands of fine material as is best seen in Fig. 3. The strip 21 may then pass over suitable rolls such as 43 which press the granular material into the soft asphalt and bond it firmly thereto. From this point, the coated strip may pass on to suitable apparatus for cutting it into individual shingles or siding strips in well known manner.

The strip 21 is guided in its passage over the table 32 by the side flanges 44. However, by providing the transverse adjusting mechanism for the sheet 22, the position of the bands of granular material on the strip 21 may be very accurately adjusted.

While I have described the illustrated embodiment of my invention in some detail, modifications and variations thereof, may occur to those skilled in the art to which it appertains. For example, the sand and granular slate shown in the hoppers 2 and 3 could be replaced by liquid paints of different colors and the apparatus could then be used, without material change, for applying bands of paint on a moving strip. I do not, therefore, limit myself to the precise details shown and described, but claim as my invention, all embodiments thereof coming within the scope of the appended claims.

I claim:

1. Apparatus of the class described comprising a plurality of hoppers having bottom discharge openings, a downwardly inclined guide plate beneath said openings, means for adjusting the position of the lower end of said plate, means on said plate for keeping the materials discharged from said discharge openings separated and means for simultaneously adjusting the position of said separating means transversely of said plate.

2. In apparatus for applying fluent material to a moving strip the combination of a hopper having a discharge opening, a downwardly inclined guide plate below said opening, a transversely adjustable sheet on said guide plate having spaced troughs on its top surface, means for changing the angle of inclination of said guide plate and sheet, and means for simultaneously moving said sheet and troughs transversely of the direction of movement of said strip while permitting adjustment of the angle of inclination of said plate and sheet.

3. In apparatus for applying fluent material to a moving strip, the combination of a pair of hoppers extending across said strip and arranged longitudinally thereof, said hoppers having parallel rows of bottom discharge openings, means for controlling the degree of opening of said discharge openings, an adjustable downwardly inclined guide plate below said openings pivotally supported at its upper end, a transversely adjustable sheet on said guide plate having spaced troughs on its top surface, said troughs being disposed beneath the discharge openings of one of said hoppers, cover plates for the tops of said troughs, means for adjusting the angle of inclination of said guide plate and sheet, said means including a lever and link connected to said plate for swinging said plate on its pivot and an adjustable stop for controlling the bottom position of said plate, and means for moving said sheet and troughs on said plate transversely of the direction of movement of said strips.

4. In an apparatus for applying fluent material to a moving strip, the combination of a hopper having a discharge opening, a downwardly inclined guide plate below said opening and pivotally supported at its upper end, a transversely adjustable sheet on said guide plate having spaced troughs on its top surface, manually operable means for swinging said guide plate about its pivot and means for simultaneously moving said sheet and troughs transversely of the direction of movement of said strip, said last named means including a pin secured to said sheet and extending downwardly through an aperture in said plate and a slotted lever adapted to operatively engage said pin for moving said sheet transversely while permitting movement of said sheet and plate about the pivoted support.

5. In apparatus of the type described the combination of a hopper having a discharge opening, a downwardly inclined guide plate below said opening, a transversely adjustable sheet on said guide plate having spaced troughs on its top surface, means for changing the angle of inclination of said guide plate and sheet, and means for simultaneously moving said sheet and troughs transversely of the direction of movement of said strip.

In testimony whereof I have hereunto affixed my signature this 20th day of November, 1930.

BENJAMIN W. LAMBACHER.